(12) United States Patent
Studer et al.

(10) Patent No.: US 10,608,686 B1
(45) Date of Patent: Mar. 31, 2020

(54) CIRCUIT AND METHOD FOR ENABLING CHANNEL DENOISING IN A WIRELESS COMMUNICATION APPARATUS

(71) Applicant: Cornell University, Ithaca, NY (US)

(72) Inventors: Christoph Emanuel Studer, Ithaca, NY (US); Ramina Ghods, Ithaca, NY (US); Seyed Hadi Mirfarshbafan, Ithaca, NY (US); Alexandra Gallyas Sanhueza, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 16/460,604

(22) Filed: Jul. 2, 2019

(51) Int. Cl.
  *H04B 1/10* (2006.01)
  *H04B 1/00* (2006.01)
  *H04B 1/12* (2006.01)

(52) U.S. Cl.
  CPC ............ *H04B 1/12* (2013.01); *H04B 1/1027* (2013.01)

(58) Field of Classification Search
  CPC ... H04B 1/04; H04B 1/10; H04B 1/16; H04B 1/40; H04B 7/0404; H04B 7/0413; H04B 7/0452; H04B 7/0617; H04B 7/088; H04B 7/0854; H04B 17/336; H04W 56/0035; H04W 72/042; H04W 72/0413; H04L 1/0045; H04L 25/0202; H04L 27/265; H04L 27/2636
  USPC .............................. 455/63.1, 67.13, 295, 296
  See application file for complete search history.

(56) References Cited

U.S. PATENT DOCUMENTS

| | | | | |
|---|---|---|---|---|
| 9,407,299 | B2* | 8/2016 | Futatsugi | H04J 11/0023 |
| 9,654,325 | B2* | 5/2017 | Ros | H04L 1/206 |
| 9,959,587 | B2* | 5/2018 | Sharma | G06T 1/0064 |
| 10,050,810 | B2* | 8/2018 | Chen | H04L 25/0202 |
| 10,284,239 | B2* | 5/2019 | Kuriyama | H01Q 3/38 |

(Continued)

OTHER PUBLICATIONS

Akdeniz, et al., "Millimeter wave channel modeling and cellular capacity evaluation," IEEE Journal on Selected Areas in Communications, vol. 32, Issue 6, Jun. 2014, 15 pages.

(Continued)

*Primary Examiner* — Quochien B Vuong
(74) *Attorney, Agent, or Firm* — Withrow & Terranova, P.L.L.C.

(57) ABSTRACT

A wireless communication apparatus is provided. The wireless communication apparatus includes a denoising circuit configured to receive a noisy complex channel vector(s) in a spatial domain and convert the noisy complex channel vector(s) into a noisy beamspace-domain vector(s) in a beamspace domain. The denoising circuit determines an optimal denoising parameter and denoises the noisy beamspace-domain vector(s) based on the optimal denoising parameter to generate a denoised beamspace-domain vector(s). The denoising circuit then converts the denoised beamspace-domain vector(s) to a denoised complex channel vector(s) in the spatial domain. In examples discussed herein, the denoising circuit determines the optimal denoising parameter and denoises noisy beamspace-domain vector(s) based on a lower-complexity denoising algorithm having reduced computational complexity compared to existing denoising methods, thus helping to enable more accurate channel estimation in the wireless communication apparatus with reduced cost, footprint, and/or power consumption.

20 Claims, 5 Drawing Sheets

(56) References Cited

U.S. PATENT DOCUMENTS 10,382,230 B2 * 8/2019 Wang .................. H04L 25/023

OTHER PUBLICATIONS

Alkhateeb, et al., "Channel estimation and hybrid precoding for millimeter wave cellular systems," IEEE Journal of Selected Topics in Signal Processing, vol. 8, Issue 5, Oct. 2014, 36 pages.

Alkhateeb, et al., "Hybrid precoding for millimeter wave cellular systems with partial channel knowledge," Information Theory and Applications Workshop, IEEE, Feb. 2013, pp. 1-5.

Alkhateeb, et al., "Limited feedback hybrid precoding for multi-user millimeter wave systems," IEEE Transactions on Wireless Communications, vol. 14, Issue 11, Nov. 2015, 14 pages.

Bhaskar, et al., "Atomic norm denoising with applications to line spectral estimation," IEEE Transactions on Signal Processing, vol. 61, Issue 23, Revised Feb. 2013, 27 pages.

Brady, et al., "Beamspace MIMO for millimeter-wave communications: System architecture, modeling, analysis, and measurements," IEEE Transactions on Antennas and Propagation, vol. 61, Issue 7, Jul. 2013, 13 pages.

Deng, et al., "MmWave channel estimation via atomic norm minimization for multi-user hybrid precoding," Wireless communications and Networking Conference, IEEE, Apr. 2018, pp. 1-6.

Donoho, et al., "Adapting to unknown smoothness via wavelet shrinkage," Journal of the American Statistical Association, vol. 90, Issue 432, Jul. 1994, 28 pages.

Gao, et al., "Channel estimation for millimeterwave massive MIMO with hybrid precoding over frequency-selective fading channels," IEEE Communications Letters, vol. 20, Issue 6, Jun. 2016, 4 pages.

Jacobsson, et al., "Throughput analysis of massive MIMO uplink with low-resolution ADCs," IEEE Transactions on Wireless Communications, vol. 16, Issue 6, Jun. 2017, 14 pages.

Jaeckel, et al., "QuaDRiGa—Quasi Deterministic Radio Channel Generator User Manual and Documentation," Document Revision: v1.2.3-307, Apr. 30, 2014, Fraunhofer Heinrich Hertz Institute, 112 pages.

Korrai, et al., "FPGA implementation of OFDM-based mmWave indoor sparse channel estimation using OMP," circuits, Systems, and Signal Processing, Sep. 2017, 12 pages.

Larsson, et al., "Massive MIMO for next generation wireless systems," IEEE Communications Magazine, vol. 52, Issue 2, Jan. 2014, 20 pages.

Lee, et al., "Channel estimation via orthogonal matching pursuit for hybrid MIMO systems in millimeter wave ,communications," IEEE Transactions on Communications, vol. 64, Issue 6, Jan. 2016, 17 pages.

Li, et al., "Channel estimation and performance analysis of one-bit massive MIMO systems," IEEE Transactions on Signal Processing, vol. 65, Issue 15, Aug. 2017, 14 pages.

Machler, P., "VLSI architectures for compressive sensing and sparse signal recovery," Ph.D. dissertation, ETH Zürich, Switzerland, 2012, 172 pages.

Maleki, et al., "Asymptotic analysis of complex LASSO via complex approximate message passing (CAMP)," IEEE Transactions on Information Theory, vol. 59, Issue 7, Jul. 2013, 20 pages.

Mamandipoor, et al., "Newtonized orthogonal matching pursuit: Frequency estimation over the continuum," IEEE Transactions on Signal Processing, vol. 64, Issue 19, Oct. 2016, 16 pages.

Mo, et al., "Channel estimation in broadband millimeter wave MIMO systems with few-bit ADCs," IEEE Transactions on Signal Processing, vol. 66, Issue 5, Mar. 2018, 14 pages.

Mo, et al., "Channel estimation in millimeter wave MIMO systems with one-bit quantization," Asilomar Conference on Signals, Systems and Computers, IEEE, Nov. 2014, pp. 957-961.

Mousavi, et al., "Parameterless optimal approximate message passing," Oct. 2013, 36 pages.

Rappaport, et al., "Millimeter wave mobile communications for 5G cellular: It will work!" IEEE Access, vol. 1, May 2013, pp. 335-349.

Rappaport, et al., "Wideband millimeter-wave propagation measurements and channel models for future wireless communication system design," IEEE Transactions on Communications, vol. 63, Issue 9, Sep. 2015, 25 pages.

Rusek, et al., "Scaling up MIMO: Opportunities and challenges with very large arrays," INFONET, GIST, Journal Club, Mar. 21, 2013, 21 pages.

Schniter, et al., "Channel estimation and precoder design for millimeter-wave communications: The sparse way," Asilomar Conference on Signals, Systems and Computers, IEEE, Nov. 2014, pp. 273-277.

Studer, et al., "ASIC implementation of softinput soft-output MIMO detection using MMSE parallel interference cancellation," IEEE Journal of Solid-State Circuits, vol. 46, Issue 7, Jul. 2011, 12 pages.

Swindlehurst, et al., "Millimeter-wave massive MIMO: The next wireless revolution?" IEEE Communications Magazine, vol. 52, Issue 9, Sep. 2014, pp. 56-62.

Tang, et al., "Compressed sensing off the grid," IEEE Transactions on Information Theory, vol. 59, Issue 11, Nov. 2013, 45 pages.

Tibshirani, Robert, "Regression shrinkage and selection via the LASSO," Journal of the Royal Statistical Society, Series B, vol. 58, Issue 1, 1996, pp. 267-288.

Tropp, et al., "Computational methods for sparse solution of linear inverse problems," Proceedings of the IEEE, vol. 98, Issue 6, Jun. 2010, pp. 948-958.

Tse, et al., "Fundamentals of Wireless Communication," New York, NY, USA: Cambridge University Press, Sep. 10, 2004, 647 pages.

Upadhya, et al., "A risk minimization framework for channel estimation in OFDM systems," Signal Processing, vol. 128, Nov. 2016, 29 pages.

Zhang, et al., "Atomic norm denoising-based channel estimation for massive multiuser MIMO systems," Signal Processing for Communications Symposium, Jun. 2015, pp. 4564-4569.

* cited by examiner

CIRCUIT AND METHOD FOR ENABLING CHANNEL DENOISING IN A WIRELESS COMMUNICATION APPARATUS

GOVERNMENT SUPPORT

This invention was made with government funds under Agreement No. HR0011-18-3-0004 awarded by The Defense Advanced Research Projects Agency (DARPA). The U.S. Government has certain rights in this invention.

FIELD OF THE DISCLOSURE

The technology of the disclosure relates generally to performing channel denoising in a wireless communication apparatus, such as a base station.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences. Fifth-generation (5G) new radio (NR) (5G-NR) wireless communication technology has been widely regarded as the next generation of wireless communication technology beyond the current third-generation (3G), fourth-generation (4G), and fifth-generation (5G) technologies. A 5G-NR capable mobile communication device is expected to achieve significantly higher data rates, improved coverage range, enhanced signaling efficiency, and reduced latency compared to a conventional mobile communication device operating based on the 3G, 4G, and/or 5G technologies.

The 5G-NR capable mobile communication device can be configured to transmit a 5G-NR RF signal(s) in an RF spectrum(s) that is typically higher than 6 GHz. Notably, millimeter wave (mmWave) communication and massive multiuser (MU) multiple-input multiple-output (MIMO) are expected to be core technologies of a 5G-NR wireless communication systems for achieving unprecedentedly high-bandwidth data transmission to multiple user equipments (UEs) in the same time-frequency resource. The strong path loss of wave propagation at mmWave frequencies, however, necessitates infrastructure base stations (BSs) to acquire accurate channel state information (CSI) in order to perform data detection in the uplink (UEs transmit to BS) and MU precoding in the downlink (BS transmits to UEs). Furthermore, the trend towards BS architectures with low-precision data converters to reduce power consumption, interconnect bandwidth, and system costs renders accurate channel estimation an increasingly important aspect of wireless system design.

SUMMARY

Embodiments of the disclosure relate to a circuit and method for enabling channel denoising in a wireless communication apparatus. In a non-limiting example, the wireless communication apparatus can be a base station having a large number of antennas organized in a uniform linear array. The wireless communication apparatus may need to obtain a channel estimation(s) based on a pilot signal(s) transmitted from a mobile communication device(s) for enabling various radio frequency (RF)-related tasks (e.g., beamforming, coherent data detection, precoding, etc.). Notably, the received pilot signal(s) may be distorted during propagation to contain a noise that can cause a channel estimation error(s). As such, the wireless communication apparatus may need to suppress the noise to help minimize the channel estimation error(s).

In this regard, the wireless communication apparatus includes a denoising circuit configured to denoise the pilot signal(s) to help minimize the channel estimation error(s). The denoising circuit receives a noisy complex channel vector(s) in a spatial domain and converts the noisy complex channel vector(s) into a noisy beamspace-domain vector(s) in a beamspace domain. Accordingly, the denoising circuit determines an optimal denoising parameter and denoises the noisy beamspace-domain vector(s) based on the optimal denoising parameter to generate a denoised beamspace-domain vector(s). The denoising circuit then converts the denoised beamspace-domain vector(s) into a denoised complex channel vector(s) in the spatial domain to be used in subsequent baseband processing tasks in the wireless communication apparatus. In examples discussed herein, the denoising circuit is configured to determine the optimal denoising parameter and denoise a noisy beamspace-domain vector(s) based on a lower-complexity denoising algorithm having significantly reduced computational complexity compared to existing denoising methods. As such, it may be possible to enable more accurate channel estimation in the wireless communication apparatus with reduced cost, footprint, and/or power consumption.

In one aspect, a wireless communication apparatus is provided. The wireless communication apparatus includes a number of antenna ports coupled respectively to a number of antennas and configured to receive at least one noisy complex channel vector in a spatial domain. The wireless communication apparatus also includes a denoising circuit. The denoising circuit is configured to receive and convert the at least one noisy complex channel vector into at least one noisy beamspace-domain vector comprising a number of noisy beamspace-domain entries. The denoising circuit is also configured to determine an optimal denoising parameter configured to denoise the at least one noisy beamspace-domain vector. The denoising circuit is also configured to denoise the noisy beamspace-domain entries in the at least one noisy beamspace-domain vector based on the optimal denoising parameter to generate at least one denoised beamspace-domain vector comprising a number of denoised beamspace-domain entries. The denoising circuit is also configured to convert the at least one denoised beamspace-domain vector into at least one denoised complex channel vector in the spatial domain.

In another aspect, a method for enabling channel estimation in a wireless communication apparatus is provided. The method includes receiving at least one noisy complex channel vector in a spatial domain. The method also includes converting the at least one noisy complex channel vector into at least one noisy beamspace-domain vector comprising a number of noisy entries in a beamspace domain. The method also includes determining an optimal denoising parameter configured to denoise the at least one noisy beamspace-domain vector. The method also includes denoising the plurality of noisy beamspace-domain entries in the at least one noisy beamspace-domain vector based on the optimal denoising parameter to generate at least one denoised beamspace-domain vector comprising a number of denoised entries in the beamspace-domain. The method also includes converting the at least one denoised beamspace-domain vector into at least one denoised complex channel vector in the spatial domain.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 2:
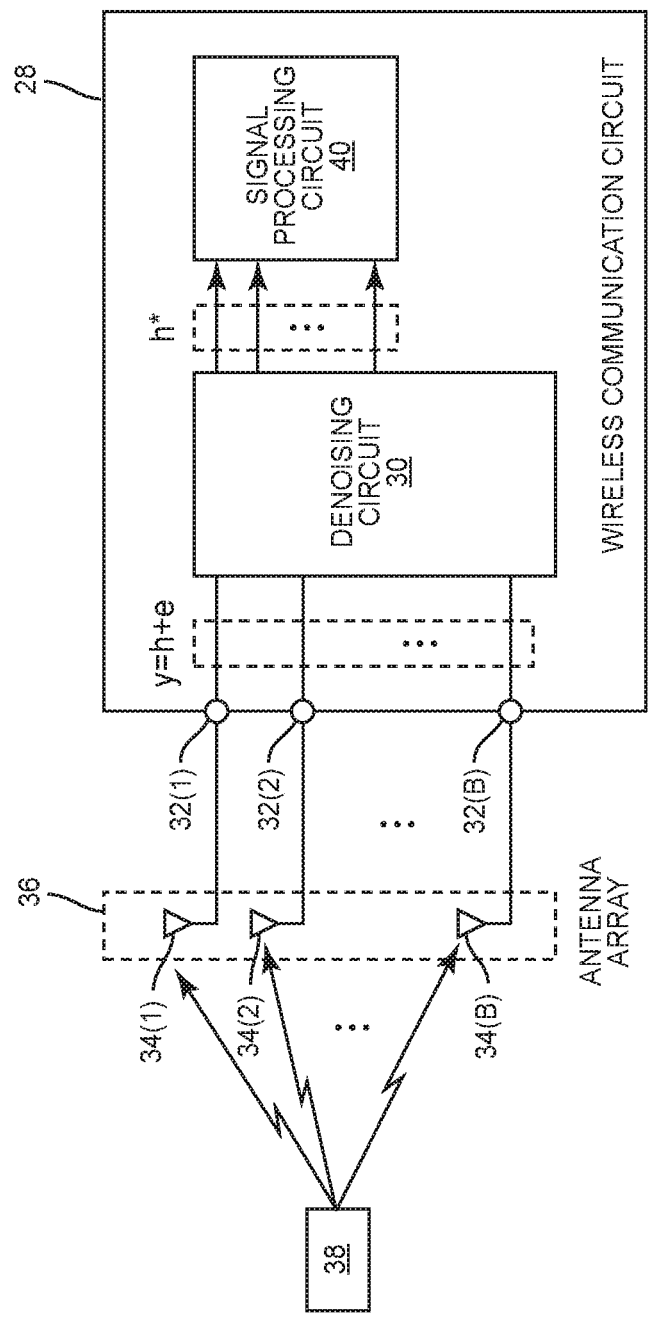
FIG. 2 is a schematic diagram of an exemplary wireless communication apparatus configured according to an embodiment of the present disclosure to enable channel denoising for massive MU-MIMO communication based on a lower-complexity denoising algorithm.
Figure 3:
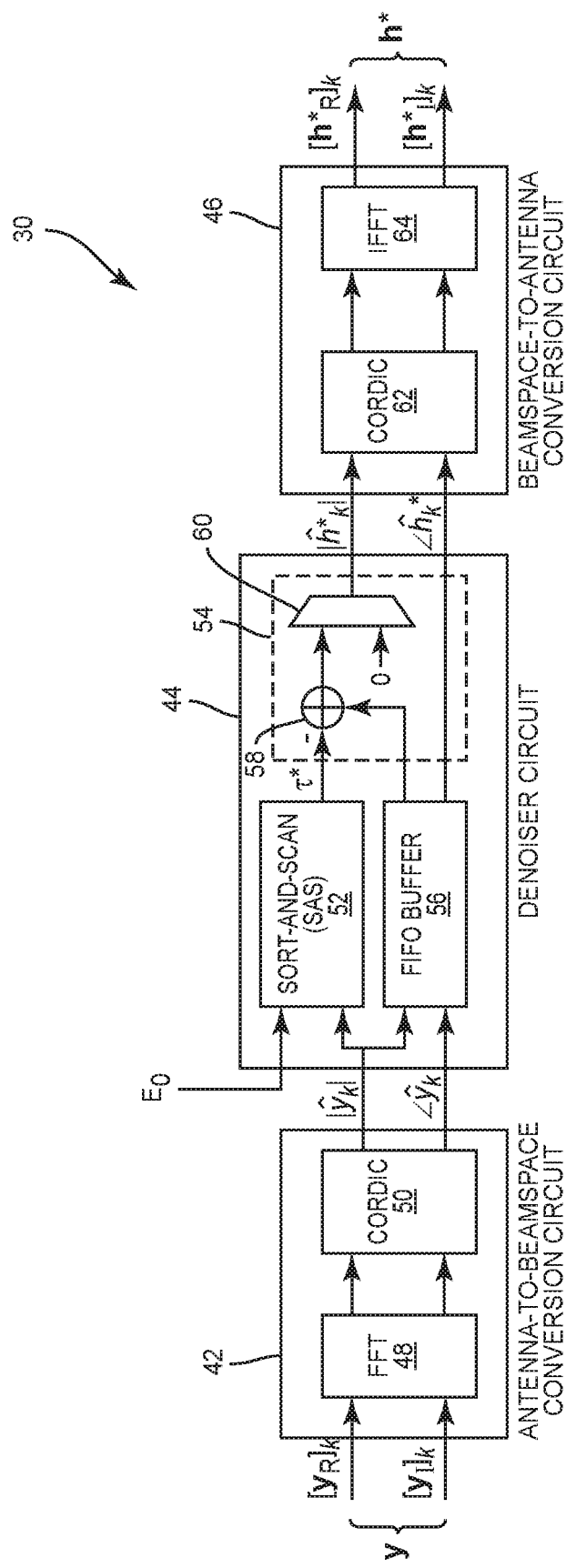
FIG. 3 is a schematic diagram providing an exemplary illustration of a denoising circuit provided in the wireless communication apparatus of FIG. 2 and configured to implement the lower-complexity denoising algorithm.
Figure 4:
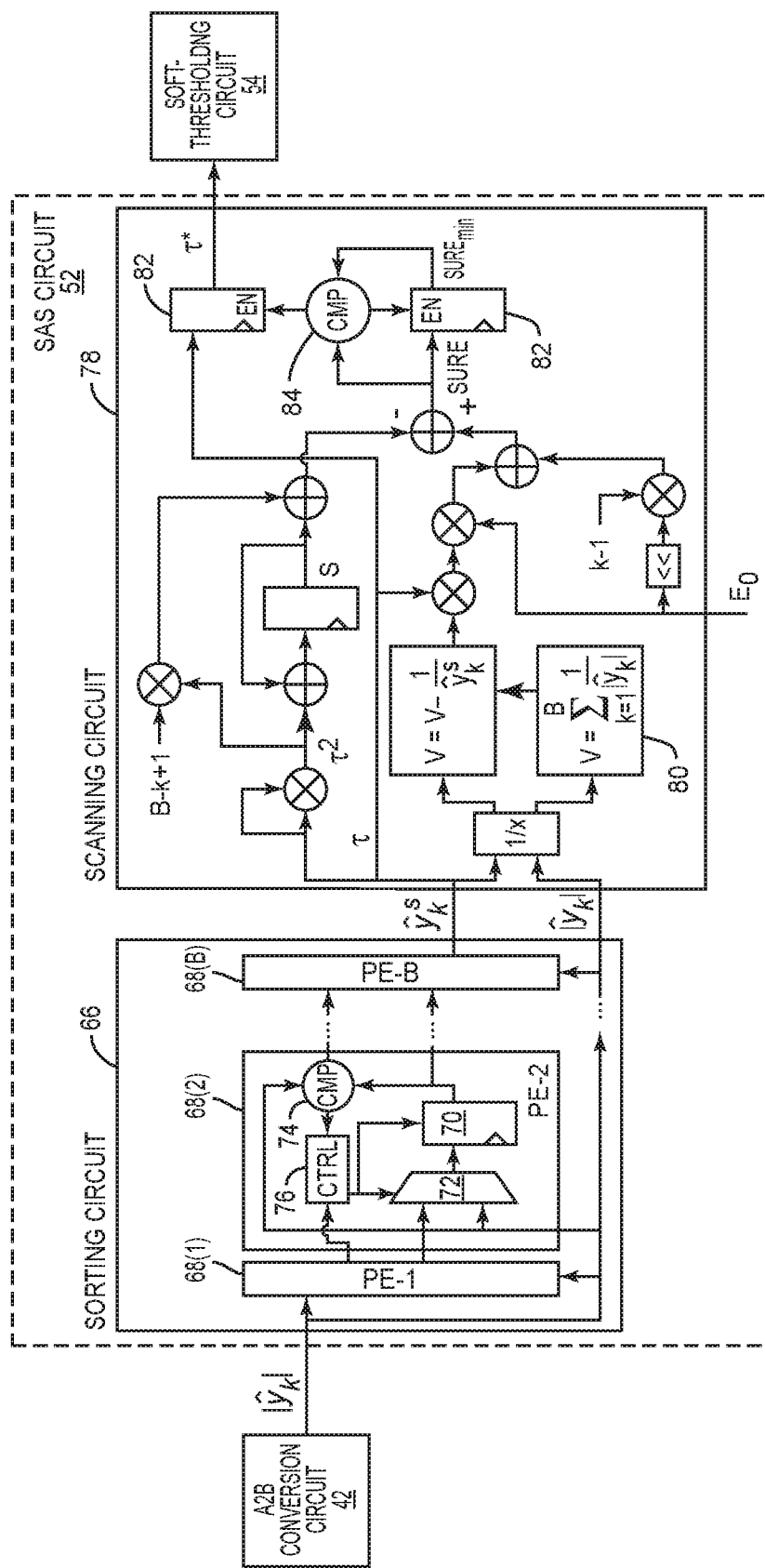
Figure 5:
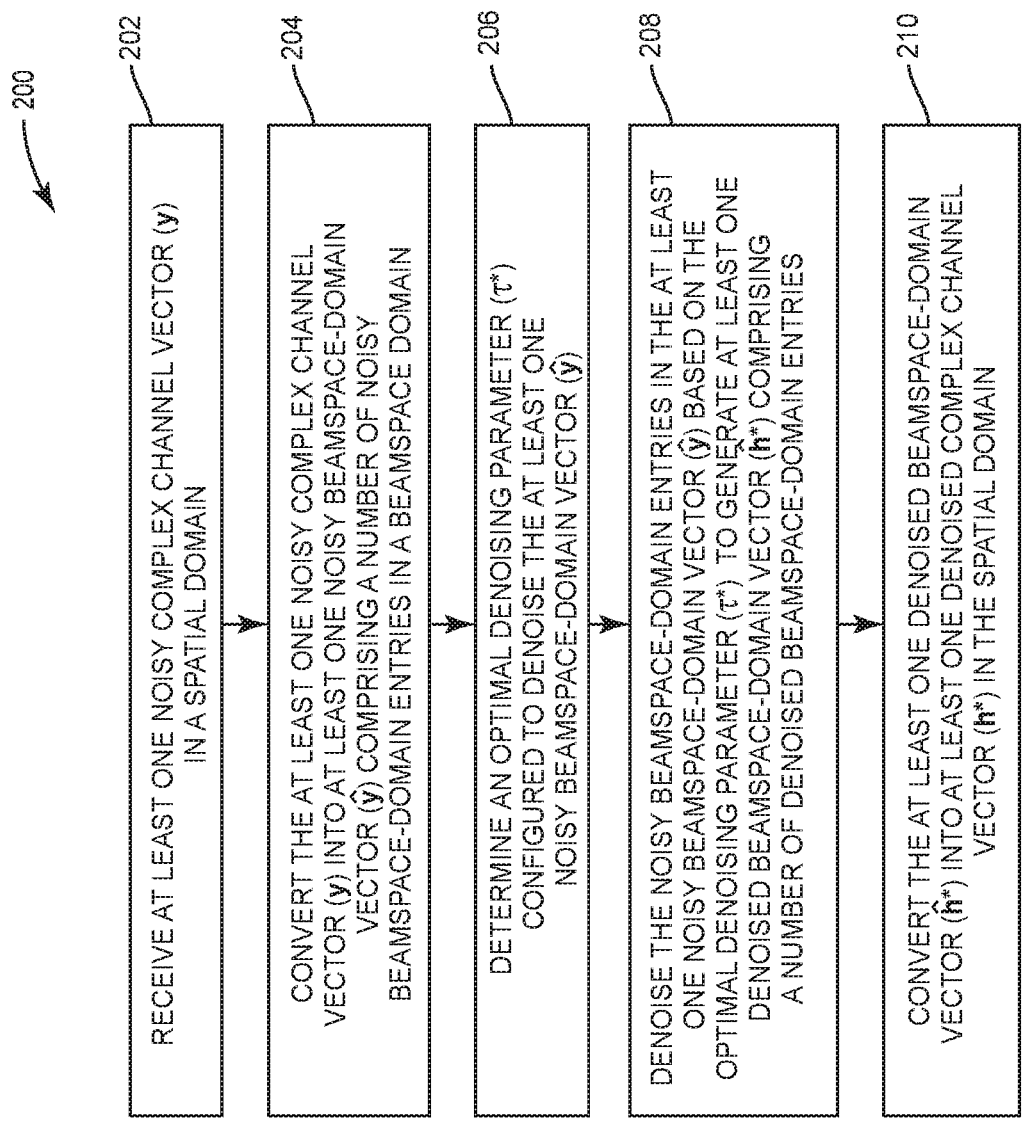

FIG. 4 is a schematic diagram providing an exemplary illustration of a sort-and-scan (SAS) circuit provided in the denoising circuit of FIG. 3 and configured to carry out the lower-complexity denoising algorithm in a streaming fashion to determine an optimal denoising parameter; and FIG. 5 is a flow diagram of an exemplary process that can be employed by the wireless communication apparatus of FIG. 2 to enable channel estimation for massive MU-MIMO communication based on the lower-complexity denoising algorithm.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a circuit and method for enabling channel estimation in a wireless communication apparatus. In a non-limiting example, the wireless communication apparatus can be a base station having a large number of antennas organized in a uniform linear array. The wireless communication apparatus may need to obtain a channel estimation(s) based on a pilot signal(s) transmitted from a mobile communication device(s) for enabling various radio frequency (RF)-related tasks (e.g., beamforming, coherent data detection, precoding, etc.). Notably, the received pilot signal(s) may be distorted during propagation to contain a noise that can cause a channel estimation error(s). As such, the wireless communication apparatus may need to suppress the noise to help minimize the channel estimation error(s).

In this regard, the wireless communication apparatus includes a denoising circuit configured to denoise the pilot signal(s) to help minimize the channel estimation error(s). The denoising circuit receives a noisy complex channel vector(s) in a spatial domain and converts the noisy complex channel vector(s) into a noisy beamspace-domain vector(s)

in a beamspace domain. Accordingly, the denoising circuit determines an optimal denoising parameter and denoises the noisy beamspace-domain vector(s) based on the optimal denoising parameter to generate a denoised beamspace-domain vector(s). The denoising circuit then converts the denoised beamspace-domain vector(s) to a denoised complex channel vector(s) in the spatial domain to be used in subsequent baseband processing tasks in the wireless communication apparatus. In examples discussed herein, the denoising circuit is configured to determine the optimal denoising parameter and denoise noisy beamspace-domain vector(s) based on a lower-complexity denoising algorithm having significantly reduced computational complexity compared to existing denoising methods. As such, it may be possible to enable more accurate channel estimation in the wireless communication apparatus with reduced cost, footprint, and/or power consumption.

Before discussing a wireless communication apparatus of the present disclosure, a notation is first provided to help understand symbols and conventions used in the present disclosure. A brief overview of a conventional wireless communication system is then provided with reference to FIG. 1 to help establish operational context of the wireless communication apparatus of the present disclosure. The discussion of specific exemplary aspects of a circuit and method for enabling channel denoising in a wireless communication apparatus starts below with reference to FIG. 2.

In the descriptions provided hereinafter, lowercase and uppercase boldface letters designate column vectors and matrices, respectively. For a vector a, the kth entry is denoted by $[a]_k = a_k$, the real and imaginary parts are indicated with $[a]_R = a_R$ and $[a]i = a_i$, respectively. The $l_1$-norm and $l_2$-norm of a vector a are $\|a\|_1$ and $\|a\|_2$, respectively. Transpose and conjugate transpose of a matrix A are represented as $A^T$ and $A^H$, respectively. The N×M all-zeros, N×N identity, and N×N discrete Fourier transform (DFT) matrices are shown as $0_{N \times M}$, $I_N$, and F, respectively. A normalized DFT matrix is shown as $FF^H = I_N$. Vectors in DFT domain are designated with a hat as in $\hat{a} = Fa$. A proper complex-valued Gaussian vector a with mean vector m and covariance matrix K is written as $a \sim \mathcal{CN}(m, K)$, while a corresponding probability density function (PDF) is shown as $f^{\mathcal{CN}}(a; m, K)$. A real-valued Gaussian vector a with mean vector m and covariance matrix K is written as $a \sim \mathcal{N}(m, K)$, while a corresponding PDF is shown as $f^{\mathcal{N}}(a; m, K)$. $\mathbb{E}[\cdot]$ represents an expectation operator. Estimates and optimal values are designated with the superscript*.

Figure 1:
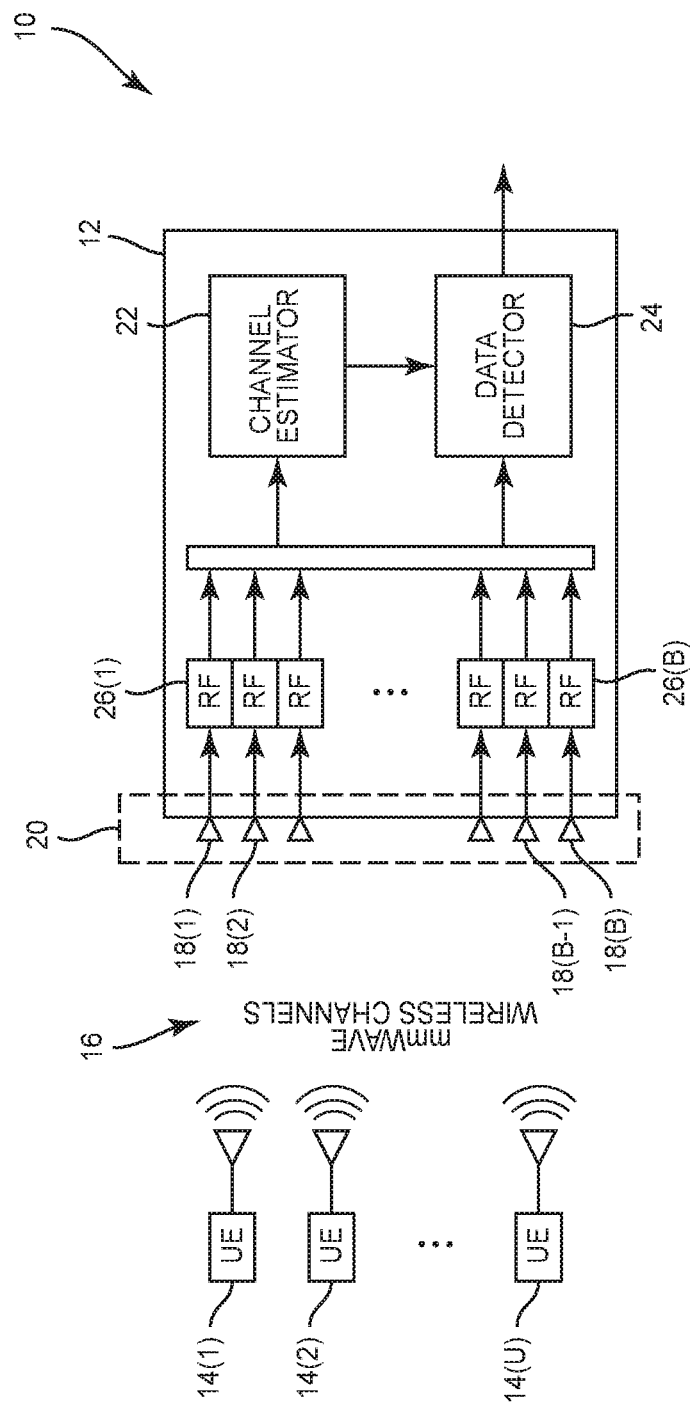
FIG. 1 is a schematic diagram of a conventional wireless communication system in which a wireless communication apparatus is configured to support massive multi-user (MU) multiple-input multiple-output (MIMO) (MU-MIMO) communications with a number of mobile communication devices over a wireless channel(s)

FIG. 1 is a schematic diagram of a conventional wireless communication system 10 in which a conventional wireless communication apparatus 12, such as a fifth-generation new-radio (5G-NR) millimeter wave (mmWave) base station, is configured to support massive multi-user (MU) multiple-input multiple-output (MIMO) (MU-MIMO) communications with a number of mobile communication devices 14(1)-14(U) (denoted as "UE") over a wireless channel(s) 16 (e.g., a mmWave wireless channel). The conventional wireless communication apparatus 12 includes a number of antennas 18(1)-18(B). The antennas 18(1)-18(B) are provided in an antenna array 20, which may be formed as a uniform linear array (ULA) in which the antennas 18(1)-18(B) are linearly aligned with equal spacing between each other. The conventional wireless communication apparatus 12 may include a channel estimator 22 and a data detector 24 each coupled to the antennas 18(1)-18(B) via a number of RF front-end circuits 26(1)-26(B). The RF front-end circuits 26(1)-26(B) can include antenna ports (not shown) coupled respectively to the antennas 18(1)-18(B).

The conventional wireless communication apparatus 12 may be configured to perform pilot-based channel estimation for each of the mobile communication devices 14(1)-14(U). Accordingly, the conventional wireless communication apparatus 12 may form and/or steer an RF beam(s) (not shown) for communicating a downlink signal(s) (not shown) to the mobile communication devices 14(1)-14(U). Each of the mobile communication devices 14(1)-14(U) may be configured to transmit an orthogonal pilot(s) (not shown) over the wireless channel(s) 16 in a dedicated training phase. In this regard, the orthogonal pilot(s) are transmitted in a spatial domain (also referred to interchangeably as "antenna domain" hereinafter). Accordingly, the conventional wireless communication apparatus 12 may estimate the propagation paths between the mobile communication devices 14(1)-14(U) and the antennas 18(1)-18(B) in the antenna array 20. In this regard, each of the antennas 18(1)-18(B) may receive a respective orthogonal pilot(s) from each of the mobile communication devices 14(1)-14(U).

In theory, when the wireless channel(s) 16 is under a flat-fading channel condition, the antennas 18(1)-18(B) in the conventional wireless communication apparatus 12 should be able to estimate a noiseless complex channel vector $h \in \mathbb{C}^B$ for each of the mobile communication devices 14(1)-14(U). Further, if the distances between the mobile communication devices 14(1)-14(U) and the antennas 18(1)-18(B) are sufficiently large, it may be possible to use a well-known plane-wave approximation, as shown in equation (Eq. 1), to model wave propagation over the wireless channel(s) 16 from any given mobile communication device among the mobile communication devices 14(1)-14(U) to each of the antennas 18(1)-18(B).

$$h = \sum_{l=0}^{L-1} \alpha_l a(\Omega_l), \ a(\Omega_l) = [e^{j0\Omega_l}, e^{j1\Omega_l}, \ldots, e^{j(B-1)\Omega_l}]^T \quad \text{(Eq. 1)}$$

In the equation (Eq. 1) above, L refers to a total number of paths (including a potential line-of-sight path) arriving at the antennas 18(1)-18(B), $\alpha_l \in \mathbb{C}$ represents a complex-valued channel gain of the l-th path, and $a(\Omega_l)$ represents a complex-valued sinusoid containing the relative phases between the antennas 18(1)-18(B), where $\Omega_l \in [0, 2\pi)$ is determined by an incident angle of the l-th path to the antennas 18(1)-18(B).

In reality, however, the conventional wireless communication apparatus 12 can only observe noisy measurements of the noiseless complex channel vector h, which may be modeled by equation (Eq. 2) below.

$$y = h + e \quad \text{(Eq. 2)}$$

In the equation (Eq. 2) above, y represents a noisy complex channel vector observed by the conventional wireless communication apparatus 12, h represents the noiseless complex channel vector as modeled by the equation (Eq. 1), $e \sim \mathcal{CN}(0_{B \times 1}, E_0 I_B)$ represents an antenna domain (spatial domain) channel estimation error with a constant variance $E_0$ per each complex entry in the noiseless complex channel vector h. Note that for the pilot-based channel estimation methods, the antenna domain channel estimation error e may be Gaussian and there may be a linear relationship between the variance $E_0$ and thermal noise variance $N_0$.

Notably, the channel model as shown in the equation (Eq. 1) may be valid for flat-fading channels assuming that each of the mobile communication devices 14(1)-14(U) is equipped with a single transmit antenna. In case each of the mobile communication devices 14(1)-14(U) is equipped with an antenna array but only transmits a single stream (layer) via RF beamforming, it may still be possible to model the respective noiseless complex channel vector h based on the equation (Eq. 1). In case the wireless channel(s) 16 exhibits frequency selectivity, it may be possible to consider orthogonal frequency-division multiplexing (OFDM) in which each subcarrier can be associated with the noiseless complex channel vector h as in the equation (Eq. 1). In the case of single-carrier (SC) transmission in frequency-selective channels or when the mobile communication devices 14(1)-14(U) are configured to transmit multiple streams concurrently, it may be necessary to estimate multiple complex channel vectors (e.g., one for each tap in the impulse response and for each layer).

Given that the orthogonal pilot(s) are transmitted in the spatial domain, the noisy complex channel vector y as modeled in the equation (Eq. 2) also describes the noiseless complex channel vector h in the spatial domain. In the spatial domain, each entry in the noiseless complex channel vector h may be associated with a respective antenna among the antennas 18(1)-18(B) in the antenna array 20. Given that the noiseless complex channel vector h may be modeled as a superposition of L complex-valued sinusoids, it is thus possible to transform the noiseless complex channel vector h into a noiseless beamspace-domain vector $\hat{h}$ in discrete Fourier transform (DFT) domain according to $\hat{h}=Fh$, where F is a B×B DFT matrix. In this regard, the DFT converts the noiseless complex channel vector h in the spatial domain into the noiseless beamspace-domain vector $\hat{h}$ in a beamspace domain (also known as angular domain), in which each entry in the noiseless beamspace-domain vector $\hat{h}$ is associated with a specific incident angle with respect to the antennas 18(1)-18(B). More importantly, if the number of paths L is significantly smaller than the number of the antennas 18(1)-18(B), then the beamspace representation $\hat{h}$ of the channel vector h may be approximately sparse. In other words, most of the channel vector's energy will be concentrated to a few entries, which are associated with the indices corresponding to the angles of the arriving waves.

The sparse nature of channel vectors in the beamspace domain makes it possible to employ a denoising algorithm(s) to denoise the noisy complex channel vector y observed by the conventional wireless communication apparatus 12. The main idea behind such denoising methods is to first transform the observed noisy complex channel vector y in the spatial domain into a noisy beamspace-domain vector $\hat{y}$ in the beamspace domain, as shown below in equation (Eq. 3).

$$\hat{y}=Fy=\hat{h}+\hat{e} \quad (Eq. 3)$$

In the equation (Eq. 3) above, $\hat{e}=Fe$ represents a beamspace domain channel estimation error that may have the same statistics as the antenna domain channel estimation error vector e. As such, it may be possible to suppress noises in coefficients associated with angles that do not pertain to the orthogonal pilot(s) by exploiting the fact that most of the arriving signal energy may be concentrated to a few coefficients. Some existing algorithms, such as orthogonal matching pursuit (OMP), atomic norm minimization (ANM), and newtonized OMP (NOMP), have been developed to denoise the noisy complex channel vector y observed in the conventional wireless communication apparatus 12. Notably, the OMP algorithm may suffer from a so-called "off-the-grid" problem. Although the more sophisticated algorithms such as ANM and NOMP may be able to overcome the "off-the-grid" problem, such algorithms may exhibit higher computational complexity, especially when the conventional wireless communication apparatus 12 employs a large number of the antennas 18(1)-18(B). As such, it may be desired to develop a hardware-friendly denoising algorithm that is computationally efficient and can achieve comparable denoising results as rendered by the ANM and NOMP algorithms.

In this regard, FIG. 2 is a schematic diagram of an exemplary wireless communication apparatus 28 configured according to an embodiment of the present disclosure to enable channel estimation for massive MU-MIMO communication based on a lower-complexity denoising algorithm. The lower-complexity denoising algorithm may be adapted from a Stein's unbiased risk estimate (SURE) algorithm, which may be well-known for denoising a noisy real-valued vector in such applications as image processing, to denoise the noisy complex-valued channel vector $\hat{y}$ as shown in the equation (Eq. 3). As discussed in detail below, the wireless communication apparatus 28 employs a denoising circuit 30 configured to denoise the noisy complex channel vector y. The lower-complexity denoising algorithm may have a significantly reduced computational complexity compared to the existing denoising algorithms such as ANM and NOMP and thus becoming more hardware-friendly than the existing ANM and NOMP algorithms. In a non-limiting example, the lower-complexity denoising algorithm may correspond to a computational complexity that scales with O(B log(B)), wherein B represents a dimension of the noisy complex channel vector y. Moreover, the lower-complexity denoising algorithm may be performed in a streaming fashion to help reduce channel denoising latency, thus helping to improve real-time performance of the wireless communication apparatus 28. By employing the denoising circuit 30 to denoise the noisy complex channel vector y based on the lower-complexity denoising algorithm, it may be possible to enable more accurate channel estimation in the wireless communication apparatus 28 with reduced cost, footprint, and/or power consumption.

In a non-limiting example, the wireless communication apparatus 38 can be a base station (e.g., a 5G-NR base station) configured to communicate over a wireless spectrum extending from sub-6 MHz to Terahertz. In this regard, the wireless communication apparatus 28 includes a number of antenna ports 32(1)-32(B) configured to be coupled to a number of antennas 34(1)-34(B), respectively. The antennas 34(1)-34(B) may be provided in an antenna array 36, which can be an ULA for example. The antenna ports 32(1)-32(B) are configured to receive at least one noisy complex channel vector y, as expressed in the equation (Eq. 2) above, in the wireless spatial domain (antenna domain) from at least one mobile communication device 38 via the antennas 34(1)-34 (B). Notably, if more than one mobile communication devices are connected to the wireless communication apparatus 28, then the wireless communication apparatus 28 may receive a respective noisy complex channel vector y from each of the mobile communication devices.

The denoising circuit 30 is configured to receive the noisy complex channel vector y from the antenna ports 32(1)-32 (B). In a non-limiting example, the noisy complex channel vector y can include an equal number of entries as the number of the antenna ports 32(1)-32(B). The denoising circuit 30 is configured to convert the noisy complex channel vector y in the spatial domain into at least one noisy beamspace-domain vector $\hat{y}$, as shown in the equation (Eq. 3) above, in the beamspace domain (angular domain). As such, the noisy beamspace-domain vector $\hat{y}$ may also include an equal number of beamspace-domain entries as the number of the antenna ports 32(1)-32(B).

As discussed earlier, the noisy beamspace-domain vector $\hat{y}$ includes the beamspace-domain channel estimation error $\hat{e}$. In this regard, for the wireless communication apparatus 28 to perform such RF-related tasks as beamforming, coherent data detection, and precoding based on a more accurate channel estimation, it may be necessary to denoise the noisy beamspace-domain vector $\hat{y}$.

A number of existing methods may be suitable for denoising the noisy beamspace-domain vector $\hat{y}$ in the beamspace domain. Among them, a least absolute shrinkage and selection operator (LASSO) may be regarded as a prominent sparse signal recovery method. A specific instance of LASSO corresponding to $l_1$-norm regularized least squares may be expressed in equation (Eq. 4) below.

$$\hat{h}^* = \mathrm{argmin}_{\hat{h}' \in \mathbb{C}^B} \frac{1}{2} \|\hat{y} - \hat{h}'\|_2^2 + \tau \|\hat{h}'\|_1^2 \qquad \text{(Eq. 4)}$$

By applying LASSO directly to the noisy beamspace-domain vector $\hat{y}$ with a suitably-chosen denoising parameter $\tau \in \mathbb{R}_+$, it may be possible to determine the $l_1$-norm regularized least squares $\hat{h}^*$ based on the equation (Eq. 4) above. A closed-form expression for a solution to the equation (Eq. 4) in the complex case may be given by a well-known entry-wise soft-thresholding operator $\eta(\hat{y},\tau)$ as defined in equation (Eq. 5) below.

$$\left[\eta(\hat{y}, \tau)\right]_b = \frac{\hat{y}_b}{|\hat{y}_b|} \max\{|\hat{y}_b| - \tau, 0\}, \, b = 1, \ldots, B \qquad \text{(Eq. 5)}$$

In the equation (Eq. 5) above, $y/|y|=0$ for $y=0$. The soft-thresholding operator $\eta(\hat{y},\tau)$ simply reduces a respective magnitude ($|\hat{y}_b|$) of an input $\hat{y}_b$ by a respective denoising parameter $\tau$ and sets the input $\hat{y}_b$ to zero when the respective magnitude is smaller than the respective denoising parameter $\tau$.

While soft-thresholding is widely used for denoising of sparse signals, the denoising performance may strongly depend on choice of the denoising parameter $\tau$. Since propagation conditions, number of arriving paths and signal strength can vary widely in wireless communication systems, a robust method to select the denoising parameter $\tau$ becomes increasingly critical. Hence, it may be desired to determine an optimal denoising parameter $\tau^*$ in a computationally-efficient manner to help denoise the noisy beamspace-domain vector $\hat{y}$ in its entirety. In a non-limiting example, determining the optimal denoising parameter $\tau^*$ to denoise the noisy beamspace-domain vector $\hat{y}$ can be equivalent to determining the optimal denoising parameter $\tau^*$ to minimize a mean square error (MSE), as expressed in equation (Eq. 6) below, of an equivalent denoised beamspace-domain vector $\eta(\hat{y},\tau)$.

$$MSE = \mathbb{E}\left[\|\eta(\hat{y}, \tau) - \hat{h}\|_2^2\right] \qquad \text{(Eq. 6)}$$

Thus, by determining the optimal denoising parameter $\tau^*$ that minimizes the MSE of the equivalent denoised vector $\eta(\hat{y},\tau)$, the denoising circuit 30 can generate at least one denoised beamspace-domain vector $h^*$ that corresponds to $\eta(\hat{y}, \tau^*)$. Unfortunately, determining the optimal denoising parameter $\tau^*$ that can minimize the MSE in the equation (Eq. 6) requires knowledge of the noiseless beamspace-domain vector $\hat{h}$, which is not available to the denoising circuit 30 in practice. In this regard, instead of determining the optimal denoising parameter $\tau^*$ that minimizes the MSE in the equation (Eq. 6), the denoising circuit 30 may be configured to determine the optimal denoising parameter $\tau^*$ to minimize SURE, which serves as an estimate of MSE. Assuming that $\hat{h} \in \mathbb{C}^B$ represents an unknown vector and $\hat{y} \in \mathbb{C}^B$ represents a noisy observation vector based on $\hat{h}$ distributed as $\hat{y} \sim \mathcal{CN}(\hat{h}, E_0 I_B)$, the SURE in the beamspace domain may be expressed in equation (Eq. 7) below.

$$SURE = \qquad \text{(Eq. 7)}$$
$$\|\mu(\hat{y}) - \hat{y}\|_2^2 + BE_0 + E_0 \sum_{b=1}^{B} \left( \frac{\partial[\mu_R(\hat{y})]_b}{\partial[\hat{y}_R]_b} + \frac{\partial[\mu_J(\hat{y})]_b}{\partial[\hat{y}_J]_b} - 2 \right)$$

In the equation (Eq. 7) above, $\mu(\hat{y})$ represents a denoising function, that is weakly differentiable and operates entry-wise on the noisy beamspace-domain vector $\hat{y}$ to serve as an estimator of the noiseless beamspace-domain vector $\hat{h}$. Accordingly, the SURE as expressed in the equation (Eq. 7) may be seen as an unbiased estimate of the MSE of the denoised beamspace-domain estimate $\mu(\hat{y})$, that satisfies the condition as expressed in equation (Eq. 8) below.

$$MSE = \mathbb{E}[SURE] \qquad \text{(Eq. 8)}$$

By replacing the estimation function $\mu(\hat{y})$ in the equation (Eq. 7) with an entry-wise soft-thresholding operator $\eta(\hat{y}, \tau)$, the SURE expression in the equation (Eq. 7) can be transformed into a modified $SURE_\tau$, as expressed in equation (Eq. 9) below.

$$SURE_\tau = \qquad \text{(Eq. 9)}$$
$$\sum_{b:|\hat{y}_b|<\tau} |\hat{y}_b|^2 + \sum_{b:|\hat{y}_b|>\tau} \tau^2 + BE_0 - E_0 \tau \sum_{b:|\hat{y}_b|>\tau} \frac{1}{|\hat{y}_b|} - 2E_0 \sum_{b:|\hat{y}_b|<\tau} 1$$

Notably, the modified $SURE_\tau$ in the equation (Eq. 9) is independent of the noiseless beamspace-domain vector $\hat{h}$. In fact, the modified $SURE_\tau$ may only depend on magnitudes of the noisy beamspace-domain vector $\hat{y}$, channel estimation error variance $E_0$, a number of the antennas 34(1)-34(B), and the denoising parameter $\tau$. As such, it may be possible to use the modified $SURE_\tau$ as a surrogate of the MSE in the equation (Eq. 6) to help determine the optimal denoising parameter $\tau^*$ based on equation (Eq. 10) below.

$$\tau^* = \min_{\tau \in \mathbb{R}_+} SURE_\tau \qquad \text{(Eq. 10)}$$

In the equation (Eq. 10) above, $\mathbb{R}_+$ represents a positive real denoising parameter set comprising the optimal denoising parameter $\tau^*$. Once the optimal denoising parameter $\tau^*$ is determined, the application of the entry-wise soft-thresholding operator $\eta(\hat{y}, \tau^*)$ will minimize the value of $SURE_\tau$, which is approximately equivalent to minimizing the actual MSE, since the MSE is equal to the expected value of $SURE_\tau$, as given by Eq. 11:

$$MSE = \mathbb{E}[SURE_\tau] \qquad \text{(Eq. 11)}$$

Notably, existing SURE-based denoising was initially put forward for wavelet-based denoising of real-valued signals. Complex-valued denoising via SURE may have also been used to denoise channel state information (CSI) in orthogonal frequency division multiplex (OFDM)-based single-input single-output (SISO) communication systems in a time domain. In contrast, the modified SURE$_\tau$, as shown in the equation (Eq. 9), can be employed to exploit a sparsity of impulse response in the beamspace domain. In this regard, the lower-complexity denoising algorithm employed by the denoising circuit 30 differs from the existing SURE-based denoising methods.

By performing soft-threshold on the noisy beamspace-domain vector ŷ based on the optimal denoising parameter τ*, the denoising circuit 30 can generate at least one denoised beamspace-domain vector ĥ* in the beamspace domain. Given that the denoising circuit 30 generates the denoised complex channel vector h* from the noisy beamspace-domain vector ŷ, the denoised complex channel vector h* can include a number of denoised beamspace-domain entries that equal the number of the beamspace-domain entries in the noisy beamspace-domain vector ŷ. As a result of the soft-thresholding performed on the noisy beamspace-domain vector ŷ, the denoised beamspace-domain vector ĥ* may become closer to the noiseless beamspace-domain vector ĥ. The denoising circuit 30 subsequently converts the denoised beamspace-domain vector ĥ* into at least one denoised complex channel vector h* in the spatial domain. As a result, a signal processing circuit 40 may be able to perform baseband signal processing tasks, including but not limited to beamforming, data detection and precoding, based on the denoised complex channel vector h*.

FIG. 3 is a schematic diagram providing an exemplary illustration of the denoising circuit 30 provided in the wireless communication apparatus 28 of FIG. 2 and configured to implement the lower-complexity denoising algorithm. Common elements between FIGS. 2 and 3 are shown therein with common element numbers and will not be re-described herein.

The denoising circuit 30 includes an antenna-to-beamspace (A2B) conversion circuit 42, a denoiser circuit 44, and a beamspace-to-antenna (B2A) conversion circuit 46. The A2B conversion circuit 42 is configured to receive the noisy complex channel vector y, as in the equation (Eq. 2), that includes a real-valued channel vector $y_R$ consisting of the real parts of the noisy complex channel vector y and a real-valued channel vector $y_I$ consisting of the imaginary parts of the noisy complex channel vector y. The A2B conversion circuit 42 may include a streaming Fast Fourier Transform (FFT) element 48 configured to convert the noisy complex channel vector y into the noisy complex beamspace-domain vector ŷ, expressed in Cartesian coordinates as two real-valued vectors, $\hat{y}_R$ and $\hat{y}_I$, that contain the real and imaginary parts of ŷ, respectively. The A2B conversion circuit 42 may also include a vectoring COordinate Rotation Digital Computer (CORDIC) 50. The vectoring CORDIC 50 may be configured to transform the outputs of the streaming FFT element 48 from Cartesian into polar coordinates in order to facilitate the application of the proposed algorithm for finding the optimal denoising parameter τ*.

The denoiser circuit 44 is configured to receive the noisy beamspace-domain vector magnitudes |ŷ| and phases ∠ŷ from the A2B conversion circuit 42. In examples discussed herein, the denoiser circuit 44 is configured to implement the lower-complexity denoising algorithm to denoise the noisy beamspace-domain vector ŷ to generate the denoised beamspace-domain vector ĥ*. In a non-limiting example, the denoiser circuit 44 includes a sort-and-scan (SAS) circuit 52, a soft-thresholding circuit 54, and a first-in first-out (FIFO) buffer 56. As further discussed in FIG. 4 below, the SAS circuit 52 is configured to determine the optimal denoising parameter τ* based on the equation (Eq. 10) and in accordance to the lower-complexity denoising algorithm.

The FIFO buffer 56 is configured to receive the noisy beamspace-domain vector magnitudes |ŷ| and the phases ∠ŷ from the A2B conversion circuit 42. The FIFO buffer 56 may be configured to hold the noisy beamspace-domain vector magnitudes |ŷ| and the phases ∠ŷ received from the A2B conversion circuit 42 when the SAS circuit 52 is sorting and scanning through the noisy beamspace-domain vector magnitudes ŷ to determine the optimal denoising parameter τ*. Once the SAS circuit 52 completes determination of the optimal denoising parameter τ*, the FIFO buffer may be configured to provide the synchronized noisy beamspace-domain vector magnitudes |ŷ| and the phases ∠ŷ to the soft-thresholding circuit 54 and the B2A conversion circuit 46, respectively.

The soft-thresholding circuit 54 may include subtracting circuitry 58 and multiplexing circuitry 60. The subtracting circuitry 58 receives the optimal denoising parameter τ* and the noisy beamspace-domain vector ŷ from the SAS circuit 52 and the FIFO buffer 56, respectively. The subtracting circuitry 58 may be configured to subtract each of the noisy beamspace-domain entries in the noisy beamspace-domain vector ŷ by the optimal denoising parameter τ* to generate a respective denoised beamspace-domain entry among the denoised beamspace-domain entries in the denoised beamspace-domain vector ĥ*. Notably, some of the denoised beamspace-domain entries may have negative amplitudes as a result of the subtraction operation performed by the subtracting circuitry 58. As such, the multiplexing circuitry 60 may be configured to zeroize (e.g., set to zero) each negative amplitude among the denoised beamspace-domain entries in the denoised beamspace-domain vector ĥ*.

The B2A conversion circuit 46 may include a rotation CORDIC 62 and an Inverse FFT (IFFT) element 64. The rotation CORDIC 62 receives the magnitude and phase of the denoised beamspace-domain vector ĥ* from the multiplexing circuitry 60 and the FIFO buffer 56, respectively. The rotation CORDIC 62 may be configured to transform the denoised beamspace-domain entries in the denoised beamspace-domain vector ĥ* from polar into Cartesian coordinates, since the IFFT element 64 operates with Cartesian coordinates. The IFFT element 64 may be configured to generate the denoised complex antenna-domain channel vector h* from the denoised beamspace-domain vector entries in the denoised beamspace-domain vector ĥ*. As such, the denoised complex channel vector h* can be expressed as two real-valued vectors, $h_R^*$ and $h_I^*$, containing the real parts and imaginary parts of the noisy complex channel vector y, respectively.

In addition to having lower computational complexity, another key aspect of the lower-complexity denoising algorithm is that the lower-complexity denoising algorithm can be implemented by hardware in a streaming fashion to help reduce processing latency and increase throughput of the denoising circuit 30. In this regard, FIG. 4 is a schematic diagram providing an exemplary illustration of the SAS circuit 52 provided in the denoiser circuit 44 of FIG. 3 and configured to carry out the lower-complexity denoising algorithm in a streaming fashion to determine the optimal denoising parameter τ*. Common elements between FIGS. 3 and 4 are shown therein with common element numbers and will not be re-described herein.

In a non-limiting example, the lower-complexity denoising algorithm can be implemented based on the following steps.

| | Lower-Complexity Denoising Algorithm |
|---|---|
| Step 1: | input y and $E_0$ |
| Step 2: | $S = 0$ and $SURE_{min} = \infty$ |
| Step 3: | $\hat{y} = FFT(y)$ |
| Step 4: | $\hat{y}^s = \text{sort}\{|\hat{y}|, \text{'ascend'}\}$ and $V = \sum_{k=1}^{B}(|\hat{y}_k|)^{-1}$ |
| Step 5: | for $k = 1, \ldots, B$ do |
| Step 6: | $\tau = \hat{y}_k^s$ |
| Step 7: | $SURE_\tau = S + (B - k + 1)\tau^2 + BE_0 - E_0\tau V - 2E_0(k-1)$ |
| Step 8: | if $SURE_\tau < SURE_{min}$ then |
| Step 9: | $SURE_{min} = SURE_\tau$ |
| Step 10: | $\tau^* = \tau$ |
| Step 11: | end if |
| Step 12: | $S = S + (\hat{y}_k^s)^2$ |
| Step 13: | $V = V - (\hat{y}_k^s)^{-1}$ |
| Step 14: | end for |
| Step 15: | $[\hat{h}^*]_k = \frac{\hat{y}_k}{|\hat{y}_k|}\max\{|\hat{y}_k| - \tau^*, 0\}, k = 1, \ldots, B$ |
| Step 16: | $h^* = IFFT(\hat{h}^*)$ |
| Step 17: | return $h^*$ |

The A2B conversion circuit 42 may be configured to perform step 3 of the lower-complexity denoising algorithm to convert the noisy complex channel vector y in the spatial domain into the noisy beamspace-domain vector ŷ. The A2B circuit may express the output ŷ in polar coordinates as an amplitude vector |ŷ| and a phase vector ∠ŷ.

The SAS circuit 52 can be configured to include sorting circuitry 66 configured to carry out step 4 of the lower-complexity denoising algorithm. In this regard, the sorting circuitry 66 may sort the noisy beamspace-domain entries in the noisy beamspace-domain vector ŷ in an ascending order to generate a sorted noisy beamspace-domain vector $\hat{y}^s$. Understandably, the sorted noisy beamspace-domain vector $\hat{y}^s$ includes an equal number of sorted noisy beamspace-domain entries as in the noisy beamspace-domain vector ŷ.

The sorting circuitry 66 may include an array of identical processing elements (PEs) 68(1)-68(B). Each of the PEs 68(1)-68(B) includes a respective register 70, a respective multiplexer 72, a respective comparator 74 (denoted as "cmp"), and a respective control unit 76 (denoted as "ctrl"). The respective register 70 may be configured to keep the magnitude of a respective sorted noisy beamspace-domain entry among the sorted noisy beamspace-domain entries in the sorted noisy beamspace-domain vector ŷs. The respective multiplexer 72 may be configured to determine whether the respective register 70 should receive a new noisy beamspace-domain entry in the noisy complex channel vector y from the A2B conversion circuit 42 or to receive a previously sorted noisy beamspace-domain entry from one immediately preceding PE among the PEs 68(1)-68(B) in the sorting circuitry 66.

The sorting circuitry 66 is configured to continuously receive the noisy beamspace-domain entries in the noisy beamspace-domain vector ŷ from the A2B conversion circuit 42 and continuously output the sorted noisy beamspace-domain entries in the sorted noisy beamspace-domain vector $\hat{y}^s$, after a certain processing latency. Note that in doing so, there is no idle time between receiving separate noisy beamspace-domain vectors, and as soon as the last noisy beamspace-domain entry of one noisy beamspace-domain vector has been received, the first noisy beamspace-domain entry of a succeeding noisy beamspace-domain vector is admitted into the sorting circuitry 66 in the next clock cycle. In a non-limiting example, the sorting circuitry 66 receives a clock signal (not shown) having a number of clock cycles. If the sorting circuitry 66 takes one clock cycle to place one noisy beamspace-domain entry in the noisy beamspace-domain vector ŷ in an appropriate position in the sorted noisy beamspace-domain vector $\hat{y}^s$, then the sorting circuitry 66 may be able to sort all the noisy beamspace-domain entries in the sorted noisy beamspace-domain vector $\hat{y}^s$ in B consecutive clock cycles, wherein B corresponds to the number of noisy beamspace-domain entries in the noisy beamspace-domain vector ŷ.

For example, if k (k≤B) noisy beamspace-domain entries in the noisy beamspace-domain vector ŷ have already been sorted and reside in the PEs 68(1)-68(k), then in the next clock cycle, the (k+1)th (unsorted) noisy beamspace-domain entry in the noisy beamspace-domain vector ŷ enters the sorting circuitry 66 and is broadcast to all the PEs 68(1)-68(B). Note that, at this clock cycle, the PEs 68(k+1)-68(B) may already contain sorted entries from the previous sorting task and be flushing out their content. The respective control unit 76 may be configured to prevent the PEs 68(k+1)-68(B) from being overwritten by keeping track of a status flag for each of the PEs 68(1)-68(B). The respective comparator 74 in each of the PEs 68(1)-68(B) compares the newly received (k+1)th (unsorted) noisy beamspace-domain entry with a respective sorted noisy beamspace-domain entry currently stored in the respective register 70. Each of the PEs 68(1)-68(B) also receives a comparison result from an immediately preceding PE among the PEs 68(1)-68(B). Continuing with the example above, the respective control unit 76 can cause the (k+1)th (unsorted) noisy beamspace-domain entry to be placed in the respective register 70 of the (m)th PE 68(m) (1≤m≤k+1), if the (k+1)th (unsorted) noisy beamspace-domain entry is smaller than the respective noisy beamspace-domain entries currently stored in the respective registers 70 of PEs 68(1)-68(m-1) and is greater than or equal to the value stored in the respective registers of PEs 68(m)-68(k). At the same time, to avoid overwriting the value stored in the respective register of PE 68(m), its value, as well as the values stored in the respective registers of PEs 68(m+1)-68(k) are moved to the immediately succeeding PEs, for example PEs 68(m+1)-68(k+1). The sorting circuitry 66 performs step 4 of the lower-complexity denoising algorithm and is repeated until all the noisy beamspace-domain entries in the noisy beamspace-domain vector ŷ are placed into the sorted noisy beamspace-domain vector $\hat{y}^s$.

For real-valued signals, it can be shown that the optimal denoising parameter τ* is equal to one of the amplitudes of the noisy beamspace-domain vector ŷ, as the value of SURE is monotonically increasing between any two consecutive elements. For the complex-valued signals, such as the noisy complex channel vector y received from the mobile communication device 38 in the spatial domain, numerical simulations suggest that the optimal denoising parameter τ* is equal to the amplitude of one of the noisy beamspace-domain entries in the noisy beamspace-domain vector ŷ. As such, it may be possible to evaluate the modified SURE, for B different denoising parameters T to determine the optimal denoising parameter τ*, wherein B equals the dimension of the noisy beamspace-domain vector ŷ as well as a count of the antenna ports 32(1)-32(B).

In this regard, the SAS circuit 52 may further include scanning circuitry 78 configured to carry out steps 5-15 of the lower-complexity denoising algorithm to evaluate the modified $SURE_\tau$ for the B different denoising parameters T to determine the optimal denoising parameter $\tau^*$. In a non-limiting example, the SAS circuit 52 may determine a number of modified $SURE_\tau$ values corresponding to a number of denoising parameters $\tau$ based on the equation (Eq. 9). Subsequently, the SAS circuit 52 may output the optimal denoising parameter $\tau^*$ as being the denoising parameter $\tau$ that minimizes $SURE_\tau$ and therefore minimizes the MSE in limit, as given by equation (Eq. 11).

Additionally, instead of recalculating the value of modified $SURE_\tau$ for B times, the scanning circuitry 78 can be configured to linearly scan through each sorted noisy beamspace-domain entry in the sorted noisy beamspace-domain vector $\hat{y}^s$ and efficiently update the modified $SURE_\tau$ value for each new entry in the noisy beamspace-domain vector $\hat{y}$ using previously calculated modified $SURE_\tau$ values.

In a non-limiting example, the sorted noisy beamspace-domain vector $\hat{y}^s \in \mathbb{R}_+^B$ contains the magnitudes of the noisy beamspace-domain entries in the noisy beamspace-domain vector Si sorted in the ascending order. For each index $k = 1, \ldots, B$, the scanning circuitry 78 can compute the modified $SURE_\tau$, as expressed in equation (Eq. 9), for the parameter $\tau = \hat{y}_k^s$, by evaluating the equivalent SURE expression below.

$$SURE_\tau = \underbrace{\sum_{b=1}^{k-1} (\hat{y}_b^s)^2}_{=S} + (B-k+1)\tau^2 + BE_0 - E_0\tau \underbrace{\sum_{b=k}^{B} (\hat{y}_b^s)^{-1}}_{=V} - 2E_0(k-1),$$

Two shortcut quantities S and V, as marked in the expression above, are introduced to help avoid recalculating the modified $SURE_\tau$ from scratch while linearly scanning through the indices $k=1, \ldots, B$ (with associated denoising parameters $\tau = \hat{y}_k^s$). In fact, it may be possible to only update the two quantities S and V for each index $k=1, \ldots, B$. As such, the lower-complexity denoising algorithm is designed to exploit exactly the above observation.

In the lower-complexity denoising algorithm, steps 5-14 detail this search with the parameters $\tau = \hat{y}_k^s$ of $k=1, \ldots, B$ to find the optimal denoising parameter $\tau^*$ that minimizes $SURE_\tau$ and therefore minimizes the MSE in limit, as shown in the equation (Eq. 11), using a linear scan that involves only five additions, three multiplications, and one division per iteration. Therefore, the linear search has a complexity of O(B). Assuming that the DFT and IDFT at step 3 and step 16, are carried out with FFT and IFFT, respectively, and the sorting procedure at step 4 uses a fast sorting algorithm (e.g., merge sort) with complexity O(B log(B)), then the computational complexity of the lower-complexity denoising algorithm only scales with O(B log(B)).

To compute the cumulative sum of reciprocals denoted by V in step 4 of the lower-complexity denoising algorithm, the scanning circuitry 78 is configured to receive the unsorted noisy beamspace-domain entries in the noisy beamspace-domain vector $\hat{y}$ concurrent to the sorting circuitry 66 receiving the unsorted noisy beamspace-domain entries in the noisy beamspace-domain vector $\hat{y}$. The reciprocal values of the unsorted noisy beamspace-domain entries may be computed sequentially using a look-up-table (LUT) (not shown) and accumulated in a register 80. As such, the cumulative sum of reciprocals is ready as soon as the scanning circuitry 78 receives the first sorted noisy beamspace-domain entry in the sorted noisy beamspace-domain vector $\hat{y}^s$. As mentioned earlier, the sorting circuitry 66 may take B consecutive clock cycles to sort B unsorted noisy beamspace-domain entries in the noisy beamspace-domain vector $\hat{y}$ to generate the sorted noisy beamspace-domain vector $\hat{y}^s$. As such, the scanning circuitry 78 may start scanning through the sorted noisy beamspace-domain vector $\hat{y}^s$ in search for the optimal denoising parameter $\tau^*$ in clock cycle B+1. The scanning circuitry 78 updates the value of the quantity V according to step 13 of the lower-complexity denoising algorithm as soon as the scanning circuitry 78 receives the sorted elements $\hat{y}_s^k$. The scanning circuitry 78 may also include arithmetic logic to compute the modified $SURE_\tau$ in step 7 of the lower-complexity denoising algorithm. The scanning circuitry 78 includes output registers 82 and an output comparator 84 configured to implement conditional assignments corresponding to steps 8-11 of the lower-complexity denoising algorithm.

The denoising circuit 30 can be configured to enable channel estimation in the wireless communication apparatus 28 based on a process. In this regard, FIG. 5 is a flow diagram of an exemplary process 200 that can be employed by the wireless communication apparatus 28 of FIG. 2 to enable channel estimation for massive MU-MIMO communication based on the lower-complexity denoising algorithm.

With reference to FIG. 5, the denoising circuit 30 in the wireless communication apparatus 28 of FIG. 2 is configured to receive at least one noisy complex channel vector y in the spatial domain (antenna domain) (block 202). The denoising circuit 30 is also configured to convert the noisy complex channel vector y into the noisy beamspace-domain vector $\hat{y}$ that includes the noisy beamspace-domain (angular domain) entries in the beamspace domain (angular domain) (block 204). The denoising circuit 30 is also configured to determine the optimal denoising parameter $\tau^*$ configured to denoise the noisy beamspace-domain vector $\hat{y}$ (block 206). The denoising circuit 30 is also configured to denoise the noisy beamspace-domain entries in the noisy beamspace-domain vector $\hat{y}$ based on the optimal denoising parameter $\tau^*$ to generate the denoised beamspace-domain vector $\hat{h}^*$ that includes the denoised beamspace-domain entries (block 208). The denoising circuit 30 is further configured to convert the denoised beamspace-domain vector $\hat{h}^*$ into the denoised complex channel vector $\hat{h}^*$ in the spatial domain (block 210).

Those skilled in the art will recognize improvements and modifications to the preferred embodiments of the present disclosure. All such improvements and modifications are considered within the scope of the concepts disclosed herein and the claims that follow.

What is claimed is:

1. A wireless communication apparatus comprising:
   a plurality of antenna ports coupled respectively to a plurality of antennas and configured to receive at least one noisy complex channel vector in a spatial domain; and
   a denoising circuit configured to:
   receive and convert the at least one noisy complex channel vector into at least one noisy beamspace-domain vector comprising a plurality of noisy beamspace-domain entries in a beamspace domain;
   determine an optimal denoising parameter configured to denoise the at least one noisy beamspace-domain vector;
   denoise the plurality of noisy beamspace-domain entries in the at least one noisy beamspace-domain vector based on the optimal denoising parameter to generate at least one denoised beamspace-domain vector comprising a plurality of denoised beamspace-domain entries; and convert the at least one denoised beamspace-domain vector into at least one denoised complex channel vector in the spatial domain.

2. The wireless communication apparatus of claim 1 wherein the denoising circuit is further configured to determine the optimal denoising parameter and denoise the at least one noisy beamspace-domain vector based on a lower-complexity denoising algorithm.

3. The wireless communication apparatus of claim 2 wherein the lower-complexity denoising algorithm has a computational complexity of O(B*log(B)), wherein B represents a dimension of the at least one noisy beamspace-domain vector.

4. The wireless communication apparatus of claim 1 wherein the denoising circuit is further configured to:
receive a clock signal having a plurality of clock cycles; and
determine the optimal denoising parameter and denoise the at least one noisy beamspace-domain vector in a number of consecutive clock cycles among the plurality of clock cycles.

5. The wireless communication apparatus of claim 4 wherein the denoising circuit comprises:
an antenna-to-beamspace conversion circuit configured to convert the at least one noisy complex channel vector in the spatial domain into the at least one noisy beamspace-domain vector in the beamspace domain;
a denoiser circuit configured to:
determine the optimal denoising parameter; and
denoise the at least one noisy beamspace-domain vector based on the optimal denoising parameter to generate the at least one denoised beamspace-domain vector; and
a beamspace-to-antenna conversion circuit configured to convert the at least one denoised beamspace-domain vector into the at least one denoised complex channel vector in the spatial domain.

6. The wireless communication apparatus of claim 5 wherein the denoiser circuit is further configured to determine the optimal denoising parameter as:

$$\tau^* = \arg\min_{\tau \in \mathbb{R}_+} \text{SURE}_\tau, \text{ wherein:}$$

$\tau^*$ represents the optimal denoising parameter;
SURE$\tau$ represents a modified Stein's Unbiased Risk Estimate; and
$\mathbb{R}_+$ represents a set of positive real numbers comprising the optimal denoising parameter.

7. The wireless communication apparatus of claim 6 wherein SURE$\tau$ is expressed as:

$$\sum_{b:|\hat{y}_b|<\tau} |\hat{y}_b|^2 + \sum_{b:|\hat{y}_b|>\tau} \tau^2 + BE_0 - E_0\tau \sum_{b:|\hat{y}_b|>\tau} \frac{1}{|\hat{y}_b|} - 2E_0 \sum_{b:|\hat{y}_b|<\tau} 1,$$

wherein:
$\hat{y}_b$ represents bth noisy beamspace-domain entry in the noisy beamspace-domain vector $\hat{y}$;
B represents a count of the plurality of noisy beamspace-domain entries in the at least one noisy beamspace-domain vector;
b represents an index of the plurality of noisy beamspace-domain entries;
$E_0$ represents a constant variance per each entry in the at least one noisy beamspace-domain vector; and $\tau$ represents a respective value for the denoising parameter selected from a set of positive real numbers for which the modified SURE$\tau$ is evaluated.

8. The wireless communication apparatus of claim 6 wherein the denoiser circuit comprises:
a sort-and-scan circuit configured to:
sort the plurality of noisy beamspace-domain entries in the at least one noisy beamspace-domain vector in ascending order;
determine a plurality of modified SURE$\tau$ values corresponding to a plurality of denoising parameters $\tau$, respectively; and
output the optimal denoising parameter as a denoising parameter among the plurality of denoising parameters corresponding to a minimal modified SURE$\tau$ value among the plurality of modified SURE$\tau$ values; and
a soft-thresholding circuit configured to denoise the plurality of noisy beamspace-domain entries in the at least one noisy beamspace-domain vector based on the optimal denoising parameter to generate the plurality of denoised beamspace-domain entries in the at least one denoised beamspace-domain vector.

9. The wireless communication apparatus of claim 8 wherein the sort-and-scan circuit comprises:
sorting circuitry configured to sort the plurality of noisy beamspace-domain entries in the at least one noisy beamspace-domain vector in ascending order; and
scanning circuitry configured to:
determine the plurality of modified SURE$\tau$ values corresponding to the plurality of denoising parameters for the plurality of sorted noisy beamspace-domain entries, respectively; and
output the optimal denoising parameter.

10. The wireless communication apparatus of claim 8 wherein the soft-thresholding circuit comprises:
subtracting circuitry configured to subtract each of the plurality of noisy beamspace-domain entries by the optimal denoising parameter to generate a respective denoised beamspace-domain entry among the plurality of denoised beamspace-domain entries; and
multiplexing circuitry configured to zeroize negative amplitudes in the plurality of denoised beamspace-domain entries.

11. The wireless communication apparatus of claim 5 wherein the antenna-to-beamspace conversion circuit is further configured to generate at least one complex phase vector in the beamspace domain based on the at least one noisy complex channel vector in the spatial domain.

12. The wireless communication apparatus of claim 11 wherein the denoiser circuit further comprises a first-in first-out (FIFO) buffer configured to:
receive the at least one complex phase vector from the antenna-to-beamspace conversion circuit; and
forward the at least one complex phase vector to the beamspace-to-antenna conversion circuit in a clock cycle immediately succeeding the number of consecutive clock cycles.

13. The wireless communication apparatus of claim 12 wherein the beamspace-to-antenna conversion circuit is further configured to generate the at least one denoised complex channel vector based on denoised beamspace-domain magnitudes of the at least one denoised beamspace-domain vector and phases of the at least one denoised beamspace-domain vector.

14. A method for enabling channel denoising in a wireless communication apparatus comprising:

receiving at least one noisy complex channel vector in a spatial domain;

converting the at least one noisy complex channel vector into at least one noisy beamspace-domain vector comprising a plurality of noisy beamspace-domain entries in a beamspace domain;

determining an optimal denoising parameter configured to denoise the at least one noisy beamspace-domain vector;

denoising the plurality of noisy beamspace-domain entries in the at least one noisy beamspace-domain vector based on the optimal denoising parameter to generate at least one denoised beamspace-domain vector comprising a plurality of denoised beamspace-domain entries; and converting the at least one denoised beamspace-domain vector into at least one denoised complex channel vector in the spatial domain.

15. The method of claim 14 further comprising determining the optimal denoising parameter and denoising the at least one noisy beamspace-domain vector based on a lower-complexity denoising algorithm.

16. The method of claim 15 wherein the lower-complexity denoising algorithm has a computational complexity of $O(B*\log(B))$, wherein B represents a dimension of the at least one noisy beamspace-domain vector.

17. The method of claim 14 further comprising:
receiving a clock signal having a plurality of clock cycles; and determining the optimal denoising parameter and denoising the at least one noisy beamspace-domain vector in a selected number of consecutive clock cycles among the plurality of clock cycles.

18. The method of claim 14 further comprising determining the optimal denoising parameter as: $\tau^* = \arg\min_{\tau \in \mathbb{R}_+} SURE_\tau$, wherein:

$\tau^*$ represents the optimal denoising parameter;

$SURE\tau$ represents a complex Stein's Unbiased Risk Estimate; and $\mathbb{R}_+$ represents a set of positive real numbers comprising the optimal denoising parameter.

19. The method of claim 18 wherein $SURE\tau$ is expressed as:

$$\sum_{b:|\hat{y}_b|<\tau} |\hat{y}_b|^2 + \sum_{b:|\hat{y}_b|>\tau} \tau^2 + BE_0 - E_0\tau \sum_{b:|\hat{y}_b|>\tau} \frac{1}{|\hat{y}_b|} - 2E_0 \sum_{b:|\hat{y}_b|<\tau} 1,$$

wherein:
$\hat{y}_b$ represents bth noisy beamspace-domain entry in the noisy beamspace-domain vector $\hat{y}$;

B represents a count of the plurality of noisy beamspace-domain entries in the at least one noisy beamspace-domain vector;

b represents an index of the plurality of noisy beamspace-domain entries;

$E_0$ represents a constant variance per each entry in the at least one noisy beamspace-domain vector; and $\tau$ represents a respective value for the denoising parameter chosen from a set of positive real numbers for which the modified $SURE\tau$ is evaluated.

20. The method of claim 18 further comprising:
sorting the plurality of noisy beamspace-domain entries in the at least one noisy beamspace-domain vector in ascending order;

determining a plurality of modified $SURE\tau$ values corresponding to a plurality of denoising parameters, respectively;

outputting the optimal denoising parameter as a denoising parameter among the plurality of denoising parameters corresponding to a minimal modified $SURE\tau$ value among the plurality of modified $SURE\tau$ values; and denoising the plurality of noisy beamspace-domain entries in the at least one noisy beamspace-domain vector based on the optimal denoising parameter to generate the plurality of denoised beamspace-domain entries in the at least one denoised beamspace-domain vector.

\* \* \* \* \*